2 Sheets--Sheet 1.

E. AXTHELM.

Self-Closing Annunciator.

No. 6,399. Reissued April 27, 1875.

Witnesses:

M. A. Van Namee.

E. Volkmann.

Inventor:

E. Axthelm by his attorney

T. S. Stetson

THE GRAPHIC CO. PHOTO-LITH. 39 & 41 PARK PLACE, N.Y.

2 Sheets--Sheet 2.

E. AXTHELM.

Self-Closing Annunciator.

No. 6,399. Reissued April 27, 1875.

Witnesses:

M. A. Van Namee

E. Volkmann

Inventor:

E. Axthelm by his attorney J. L. Stetson

THE GRAPHIC CO. PHOTO-LITH. 39 & 41 PARK PLACE, N.Y.

UNITED STATES PATENT OFFICE.

ERNST AXTHELM, OF PITTSBURG, PENNSYLVANIA.

IMPROVEMENT IN SELF-CLOSING ANNUNCIATORS.

Specification forming part of Letters Patent No. 150,274, dated April 28, 1874; reissue No. 6,399, dated April 27, 1875; application filed December 15, 1874.

*To all whom it may concern:*

Be it known that I, ERNST AXTHELM, of Pittsburg, in the county of Allegheny and State of Pennsylvania, have invented a new and useful Improvement in Annunciators, for hotels and other buildings, of which the following is a specification:

The accompanying drawings and description set forth what I consider the best means of carrying out the invention.

Figure 1:
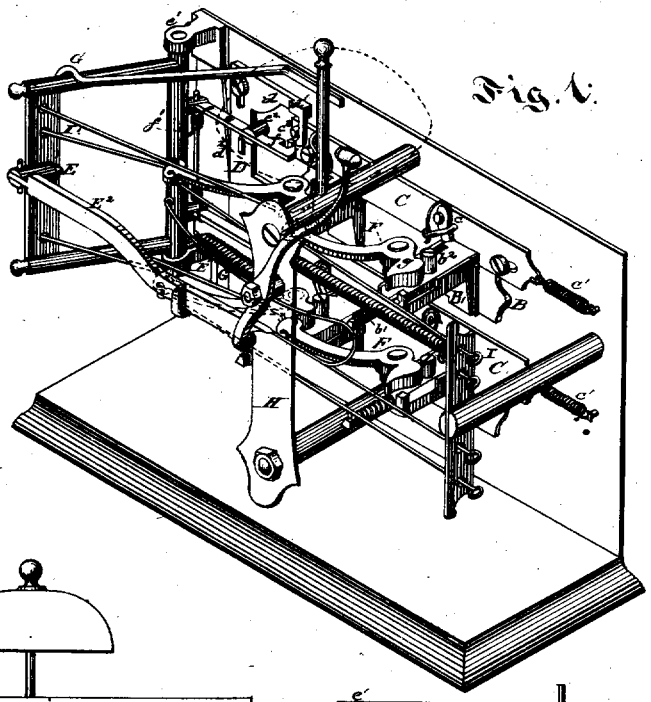
Figure 2:
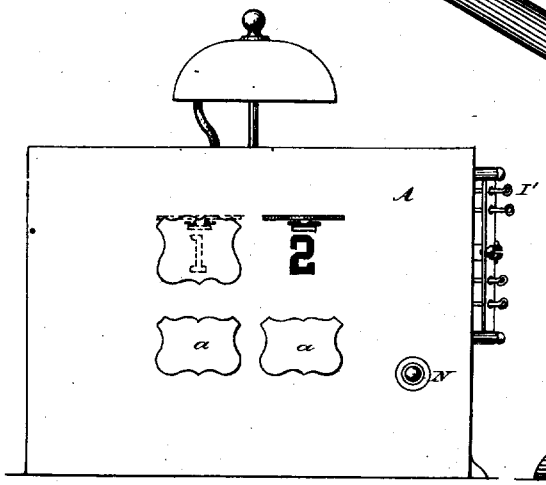
Figure 3:
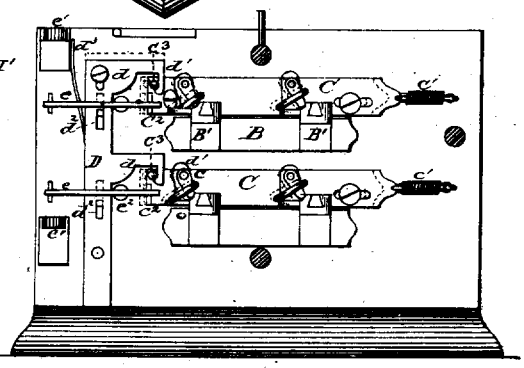
Figure 4:
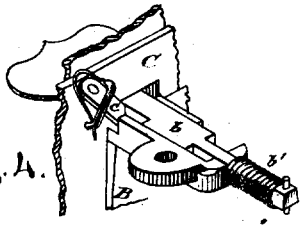
Figure 6:
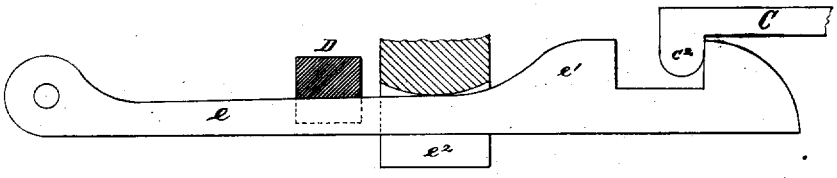
Figure 5:
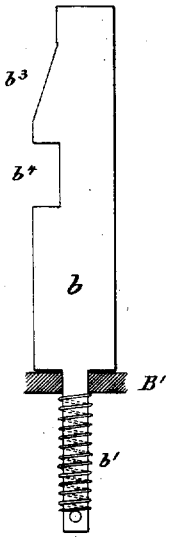
Figure 7:
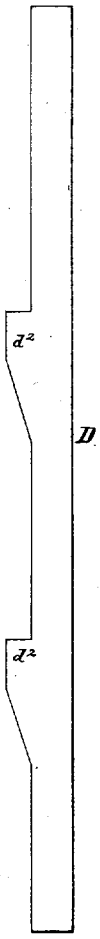

Figure 1 is an isometrical view of the rear operative portions of the annunciator. Fig. 2 is a front view, showing the face of the annunciator. Fig. 3 is a rear view, showing the bracket for supporting the bolt, the locking-slides, and the coupling-slide. (The remaining figures are on a larger scale.) Fig. 4 is an isometrical view of the spring-bolt and its connections. Fig. 5 is a view of the said bolt detached. Fig. 6 is a view of a certain catch detached; and Fig. 7 is an edge view of my coupling-slide detached.

Similar letters of reference indicate like parts in all the figures.

I employ a combination of devices, such as spring-bolts, locking-slides therefor, a coupling-slide with bell wires or their equivalents and intermediate mechanism whereby parts are moved on the face of an annunciator to show the number of the room from which the wire is pulled, and are held so as to show the number until the next alarm is struck, on which the first is liberated and restored to its first condition. I employ spring-catches on certain slides; employed so as to allow of less careful adjustment than would be otherwise necessary. I employ levers operated from the bell-wires for advancing the spring-bolts; also, a coupling-slide, whereby the parts are so connected at will that the doors are not thus liberated by the operation of the next wire, but are held up until such time as they are intentionally released. The details of the construction are more specifically set forth below.

A represents the face of an annunciator, provided with the usual series of figures indicating the several rooms, and provided with swinging doors *a*, covering each figure. These doors are hinged above, and may be raised by means of spring-bolts *b*, as shown in Fig. 2.

The fixed case B′ of each spring-bolt *b* has a projection upon it for pivoting the corresponding lever F, by which the bolt is operated, each lever F being separately actuated directly by a separate bell-wire, I.

I will first proceed to describe one of the spring-bolts and connections, which description will apply to any number which may be used.

An extension of each spring-bolt *b*, in the rear of its casing B′, is provided with a coiled spring, $b^1$, which retracts the bolt. On the upper side is a pin or projection $b^2$, against which the short arm of the corresponding lever F operates for forcing out the spring-bolt *b* against the force of its spring $b^1$. The levers F for operating the spring-bolt *b* have a wing-like projection, *g*, on the short arm, the object of which is to prevent the projection or pin $b^2$ of the spring-bolt *b* from escaping past the short arm. Each bolt *b* has upon one side an incline, $b^3$, and also a rectangular recess, $b^4$, for the purposes hereinafter specified. C represents a slide crossing above a plate or bracket, B, which sustains a tier of cases, B′, with spring-bolts *b*. The slide C is secured to the back of the face of the annunciator by means of screws inserted through slots, so as to allow a limited lateral movement. I have shown two tiers of doors with their corresponding spring-bolts *b*, and consequently two slides, C, each crossing just above the corresponding tier of spring-bolts. There may be a greater number, if preferred, and also a greater number than two in each tier. Each slide C is subject to the force of a spring, *c*,′ and is provided with spring catches or dogs *c*, the spring dogs being pivoted to the slide, and their movements guided and limited by a staple or strap. Upon one end of each slide C are two projections, $c^2$ and $c^3$, the projection $c^2$ being upon the lower side of the slide, and the projection $c^3$ being upon the upper portion of the slide. E represents a lever or swinging frame of peculiar construction, pivoted at the two points $e^1$, and which performs important functions. The long arm of E is connected with each lever F by a separate wire, I′, so that the operating of any one of the wires I will not only turn the corresponding lever F but will also turn the frame E.

The bell-wires $I^1$ pass loosely through the long arm of the lever E, and are each provided with a knot or small knob on the farther side, to make each effective when pulled, but capable of standing still when the frame or lever E is turned by the pulling of any other wire. A strong spiral spring, $E^1$, extends from a short arm of the lever E to a fixed projection upon the bracket or rear face of the annunciator, and moves the lever or frame E back to the position shown as soon as the bell-wire is released. Other short arms on the lever E are provided with catches *e*, corresponding in number to the number of slides *c*, and guided by recessed lugs or pins $e^2$, fixed to the rear face of the annunciator. These catches *e* are each formed with an inclined projection, $e^1$, which, acting in the guide-stud, causes the catch to rise gradually as it is drawn to the left in Fig. 1, so as to finally release its slide C, which is at once retracted by the spring C′. G represents a spring-stop for the lever E, and $f'$ are coiled or other springs, to keep the catches *e* in position. D indicates a vertical coupling-slide, formed with slots, which permit of its being raised or lowered, and having a series of arms corresponding in number to the series of locking-slides C employed. Each arm *d* has a downward projection, $d^1$, upon the end of which is a triangular projection, which acts on the pin $c^3$ of the slide C. A spring, $d^3$, is attached to the vertical coupling-slide D, for the purpose of pressing it forward, and keeping it in proper position by the friction. Upon the vertical portion are a series of wedge-faces, $d^2$, for raising the catches *e* out of contact with the slides C. The slide D may be raised and lowered, to couple or uncouple the catches *e*, by means of a knob, N. (See Fig. 2.) H is a brace-plate, on which the hammer of the gong is pivoted, said hammer being provided with a retracting-spring, as usual, and operated from the lever E through the spring-catch arm $E^2$. Upon each movement of the lever E, by means of the spring-arm $E^2$, motion is imparted to the hammer and an alarm sounded. The arrangement of the wires, in extending to the rooms and other points not specifically described, is of the common form adopted in analogous apparatus, and requires no specific description.

I will first describe the operation of my devices with the coupling-slide D down, and consequently with the slides C C operating together by means of the catches *e*. The wire I from room No. 1 being pulled, draws forward the long arm of the corresponding lever F, forcing the corresponding spring-bolt forward, and raising the door for said number. At the same time, through the lever E and the catches *e*, all the several slides C are moved laterally to the left; but, owing to the inclined projection $e^1$ on the under side of each of the several catches *e*, after the slides C have moved a short distance, all are released, and all are thrown instantly back to their first positions by their springs $c^1$. In this movement all of the spring-dogs *c* are again brought into contact with their respective spring-bolts *b*; but as only one of them has been moved forward, only that one receives the catch in its rectangular notch, and is thereby held. In other words, on the return of the slide C, one of them engages the proper spring-dog *c* in the rectangular recess in the side of the spring-bolt, which belongs to No. 1, and holds it forward, thus sustaining the door of said number, while all the rest remain unaffected. When the wire I from room No. 1 is afterward slackened, the lever or frame E turns quickly back to its original position.

When the wire I of the second number, or any succeeding number, is drawn in the same manner, the lever of the spring-bolt corresponding to said number forces that bolt forward, and lifts the corresponding door *a*, and shows the corresponding number, in the same manner as described for No. 1. At each operation the lever E turns, and, by means of the catches *e*, moves laterally all the slides C, as before described. This movement is always sufficient to take all the dogs *c* out of contact with their spring-bolts. The spring-bolt *b* of No. 1 being thus liberated is retracted by its spring, and returns to its original position, allowing the door of said number to fall. This will be the operation following each successive alarm when the coupling-slide D is depressed, or is in the position plainly shown in Figs. 1 and 3. The pulling of each wire I will liberate any door *a* previously held up, and will leave its own door *a* held up until some one pulls again. If the same wire is pulled many times, it will each time liberate its door *a*, and then will again hold it up, leaving it held as before.

When it is desired to uncouple, the coupling-slide D is raised, as shown in dotted lines, Fig. 3. The projections $d^2$ upon the coupling-slide pass under the catches *e* of the lever, raising said catches out of contact with the lugs on the slide C. At the same time, the triangular projection on the end of each arm $d'$, working over the pin $c^3$ on each slide C, gives a simultaneous side movement to all the slides C, releasing the spring-bolts and allowing all the doors *a* to fall. Now, the pulling of any wire I will operate upon the corresponding spring-bolt *b*, through the corresponding lever F, and by means of its incline, (see Fig. 5,) will move the corresponding dog *c* only sufficiently to allow the passage of the shoulder of said bolt *b* beyond it, so as to be caught and held in position, but it will not move the slides C so as to release any of the other spring-bolts *b* that have been previously carried forward. A pulling of another wire I will carry forward the bolt *b* corresponding thereto, which, after passing its dog *c*, will be caught thereby, and so the successive doors will be raised as the alarms are sounded, and will be retained in position.

When it is desired to release these doors thus held up, the coupler D is brought down into its first position. The projections $d^2$ upon its vertical portion passing from beneath the catches *e*, and the projection on the arm $d^1$ working over the pins $c^3$ upon the slides C, give a simultaneous lateral movement to all the slides, releasing the spring-bolts that sustain the doors. The coupler D may then be moved up again to leave the slides uncoupled, or allowed to remain down to leave them coupled, as preferred.

By this means it is within the power of the hotel-clerk, or other party, by coupling the series of slides, to cause each door to fall when the successive alarms are struck, or, by uncoupling the slides, to cause every door which is raised to remain raised until the whole are intentionally released.

It is evident from the description of the spring-bolt, and the incline thereon, that the spring-dogs *c* upon the slides C may be omitted, the slides having a sufficient lateral movement. Upon being retracted, the side of the slot through which the bolt passes may be made to engage the bolt *b*, and to perform the same functions as the spring-dog *c* above described; but this is not a desirable construction, as a more delicate adjustment is required than when the said spring-dogs *c* upon the slides C are used.

Having thus described my invention, I claim—

1. The combination of a bolt provided with a retracting-spring, a locking-slide having spring-dogs, and a lever operated from the bell-wire for advancing the bolt, substantially as and for the purpose specified.

2. The combination of the bolts *b*, locking-slides C, bell-wires I, and intermediate mechanism, whereby the pulling of any one of the wires I exhibits a corresponding number, and conceals the number previously exhibited, as and for the purposes specified.

3. The locking-slides C, provided with the spring-catches *c*, substantially as specified.

4. The coupling-slide D, provided with the arms $d$ $d^1$, in combination with the locking-slide C, having the pins or projections $c^2$ $c^3$, substantially as specified.

5. The coupling-slide D, having the lugs $d^2$, in combination with the catches *e* of the lever E, substantially as and for the purpose specified.

6. In combination with an annunciator a coupling-piece, by moving which the annunciator is changed at will from a self-closing to a hand-closing condition, and its reverse, as specified.

In testimony whereof I have hereto set my hand this 10th day of December, 1874, in the presence of two subscribing witnesses.

ERNST AXTHELM.

Witnesses:

WM. LITTLE,

JOS. EICHBAUM.